US005400203A

United States Patent [19]

Tice

[11] Patent Number: 5,400,203

[45] Date of Patent: Mar. 21, 1995

[54] SHORT CIRCUIT DETECTOR AND ISOLATOR

[75] Inventor: Lee Tice, Bartlett, Ill.

[73] Assignee: Pittway Corporation, a Delaware Corporation, Chicago, Ill.

[21] Appl. No.: 922,471

[22] Filed: Jul. 29, 1992

[51] Int. Cl.$^6$ .............................................. H02H 3/08

[52] U.S. Cl. ........................................ 361/62; 361/65; 361/93; 361/55

[58] Field of Search ....................... 361/55, 62, 63, 67, 361/93, 65

[56] References Cited

U.S. PATENT DOCUMENTS

| | | | |
|---|---|---|---|
| 3,970,898 | 7/1976 | Baumann et al. | 361/62 |
| 4,369,435 | 1/1983 | Adachi et al. | 340/506 |
| 4,528,610 | 7/1985 | Payne | 361/62 |
| 5,097,259 | 3/1992 | Testa et al. | 340/825.36 |

FOREIGN PATENT DOCUMENTS 0101172 2/1984 European Pat. Off. .

*Primary Examiner*—Marc S. Hoff
*Assistant Examiner*—S. Jackson
*Attorney, Agent, or Firm*—Dressler, Goldsmith, Shore & Milnamow, Ltd.

[57] ABSTRACT

An isolation circuit, which draws essentially zero current in a normal or stand-by state, uses a normally closed relay in combination with a storage element. A capacitor can be used as the storage element to energize the relay, using previously stored energy, in the event that a communication line to which the isolator is coupled exhibits a short circuit or low voltage condition. In this instance, the prestored energy on the capacitor activates the relay for a predetermined period of time, thereby open circuiting the communication line. When voltage is reapplied to one side of the isolator circuit, the relay is continuously energized and maintained in its open circuit condition until the low voltage or short circuit has been remedied.

18 Claims, 1 Drawing Sheet

SHORT CIRCUIT DETECTOR AND ISOLATOR

FIELD OF THE INVENTION

The invention pertains to electrical circuits for detecting and isolating short circuits. More particularly, the invention pertains to electrical circuits for detecting and isolating short circuit faults which may occur in the operation of electrical transmission or detection systems, such as systems of smoke alarms or fire detectors.

BACKGROUND OF THE INVENTION

Electrical detection or transmission systems typically employ two lines or wires to deliver electrical power to the detector, alarm or other unit requiring electrical power. One of these lines is typically the higher voltage or "hot" line, and the other is the neutral, reference or ground line. One such system is disclosed in Tice et al., U.S. Pat. No. 4,916,432, assigned to the assignee of the present invention, and incorporated herein by reference.

Each set of two lines from a power source may be used to transmit power using electrical pulses, as in the Tice et al. patent, to many detectors or alarms which, for example, may be used throughout an entire floor or section of a large building. In addition, each set of the lines may also be used simultaneously to transmit information, such as the occurrence and location of a fire, between the detectors and a central monitor or control panel.

During the use and operation of these detection or transmission systems, however, faults may develop in the detectors or other equipment which create a short circuit in the transmission lines. These short circuit faults may disable and render inoperative entire sections of the detection system, particularly those sections operating from a common set or pair of transmission lines.

The disabling of such systems, such as fire detection systems, may place otherwise monitored areas at risk pending systems repairs. Accordingly, to avoid such potentially unacceptable risks, a need has arisen for circuits capable of both detecting such short circuit faults and isolating them from the remainder of the system, which may then continue to function normally.

Electrical circuits are currently available which provide some means for detecting and isolating such short circuits. For example, Payne U.S. Pat. No. 4,528,610 discloses an electrical circuit, normally operating in an on state, which switches off in response to a short circuit.

Transistors are used in the transmission line which are normally on and which conduct power or information signals between adjacent transmission line segments. In the event of a short circuit, the transistors no longer have sufficient voltage to be biased in an on state and switch off, isolating the short circuit.

While such known circuits are capable of isolating a short circuit, the known circuitry requires an appreciable electrical current, which may cause significant voltage drops in the line, both during normal operation and in the absence of a short circuit. These current requirements and successive voltage losses limit the number of isolators which may be employed in such a transmission system.

Accordingly, it would be desirable to have short circuit detectors and isolators having minimal current requirements during normal operation and which do not cause successive voltage losses from each detector and isolator unit employed across the lines. In addition, it would be desirable to have such a detector and isolator unit require fewer components, both for ease for manufacture and lower cost to the consumer or other end-user. Thus, there continues to be a need for short circuit detectors and isolators for transmission and detection systems which provide features and benefits of the type described above not heretofore available in such products.

SUMMARY OF THE INVENTION

An isolation circuit in accordance with the invention incorporates a relay which is electrically coupled in series with a transmission line. Preferably, a non-latching relay will be used.

The relay is normally closed, and accordingly, during normal operation, the relay does not cause any significant voltage drop between successive segments of the line. In the normally closed state, very little standby current is required by the circuit.

The relay includes a control coil. When the coil is energized by, for example, an electrical current, the resulting magnetic field causes the relay to open, creating an open current in the line. This open circuit isolates any short circuit in that portion of the transmission line which is connected to one of the two relay terminals.

An energy storage element, such as a capacitor, is used to store energy for any subsequent energizing of the relay coil. In a preferred embodiment, a capacitor is coupled through diodes to the line on each side of the relay. The capacitor is charged or recharged directly from the power supply feeding the line.

Switching circuitry is employed to both sense the occurrence of a short circuit in the line and, in response to such a short circuit, switch on and allow the energy storage element to discharge the stored energy through the energy relay coil. The relay then changes states and open circuits the line, thereby isolating the short circuit from the remainder of the transmission line.

In one embodiment, the switching circuitry also includes transient suppression circuitry, such that the switching circuitry does not turn on in response to a temporary, short lived voltage drop in the line.

Numerous other advantages and features will became readily apparent from the following detailed description of the invention and the embodiments thereof, from the claims and from the accompanying drawings in which the details of the invention are fully and completely disclosed as a part of this specification.

These and other aspects and attributes of the present invention will become increasingly clear upon reference to the following drawings and accompanying specification.

DETAILED DESCRIPTION OF THE PREFERRED EMBODIMENT

Figure 1:
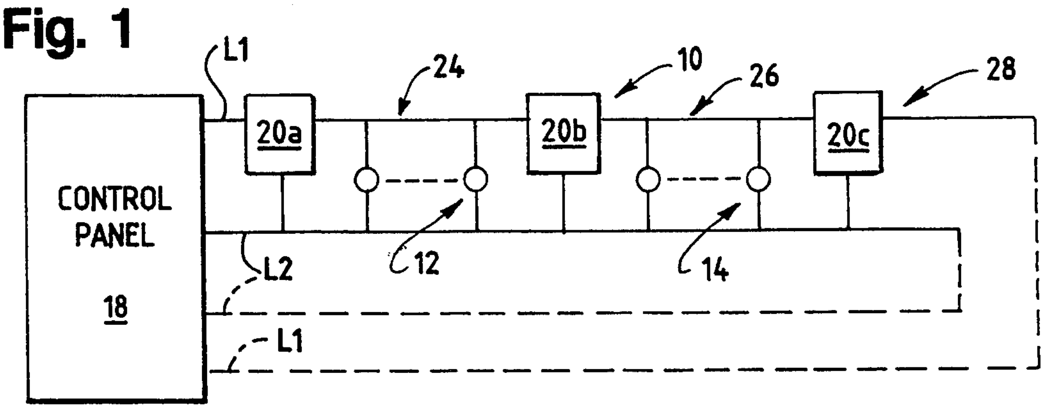
FIG. 1 is a block diagram of a detector system including transmission lines, detectors, and multiple isolator circuits.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

FIG. 1 illustrates a block diagram of a detection system 10. The system 10 could include first and second pluralities of detectors 12, 14, coupled between first and second transmission lines L1, L2.

The transmission lines L1, L2 terminate at a control panel 18. If desired, the lines L1, L2 can be returned to the control panel, as indicated in phantom in FIG. 1, providing a transmission loop for enhanced reliability. In normal operation, electrical pulses are transmitted between the detectors 12, 14 and the control panel 14.

The pluralities of detectors 12, 14, which could be smoke, temperature, or other types of condition sensing detectors, are separated from the control panel 18, and from one another by a plurality of spaced apart isolation circuits, including members 20*a*–20*c*. The isolation circuits 20*a*–20*c* each detect conditions which produce short circuits or low voltages between lines L1, L2.

When a short circuit condition or an abnormally low voltage condition is detected, the isolation circuits 20*a*–20*c* isolate various line segments, such as the line segment 24 and the line segment 26, from one another and also from the control panel. Subsequently, one or more of the isolation circuits 20*a*–20*c* resets, thereby reestablishing the voltage difference between the lines L1 and L2 outside of the segment where the short or other defect is located.

By virtue of the operation of the isolation circuits 20*a*–20*c*, if the segment 26 is shorted, the segment 24 will be isolated therefrom by the isolator 20*b* and continue to function normally. In the event that the lines L1 and L2 are returned to the panel 18 as indicated in phantom in FIG. 1, providing a loop upon which numerous additional detectors can be installed, the isolator 20*c* will also function to isolate the segment 26 from an adjacent segment 28.

Figure 2:
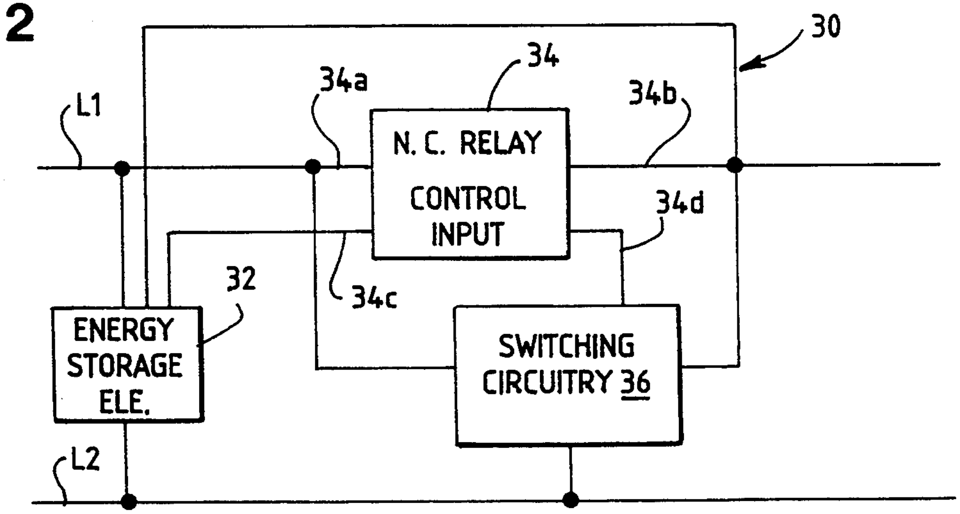
FIG. 2 is block diagram illustrating the functional components of an isolator circuit in accordance with the present invention.

FIG. 2 illustrates a block diagram of an isolation circuit 30, in accordance with the present invention. The isolation circuit 30 corresponds to any one of the isolation circuits 20*a*–20*c* of the system 10.

The circuit 30 includes an energy storage element 32, a normally closed relay 34, and a switching circuit 36. The normally closed relay 34 has switch contacts 34*a*, 34*b*, as well as coil contacts 34*c*, 34*d*.

The relay 34 can be coupled in series with the line L1 via the normally closed contacts 34*a*, 34*b*. In this condition, the relay 34, in its unactuated, normally closed state, is transparent to the operation of the system 10 in the absence of short circuit conditions. Under normal operating conditions, a voltage differential exists across the lines L1, L2 as is conventional for detection systems which incorporate a plurality of detectors coupled across first and second transmission lines.

Under normal operation, the energy storage element 32 is charged and stores a predetermined quantum of energy. The energy storage element 32 can be implemented as a capacitor, or an inductor, for example.

In the presence of a low voltage or a short circuit condition, the voltage differential across the lines L1, L2 is reduced from its normal operating condition to a substantially lower voltage, perhaps approaching zero volts. In this condition, the energy storage element 32, in combination with switching circuitry 36, provides, for a period of time, energy to the coil inputs 34*c*, 34*d*, thereby energizing the relay 34 and opening the normally closed contacts 34*a*, 34*b*.

When the coil is energized, the isolation circuit 30 isolates the various segments 24, 26, and 28 of the line L1, L2 from one another. Subsequently, the quantity of energy stored on the storage element 32 will begin to discharge.

If, for example, the circuit 30 corresponds to the isolator circuit 20*a* in FIG. 1, assuming that the control panel 18 is functioning normally and the segment 24 is not a short circuit, the relay 34 will return to its normally closed condition. In this instance, with the relay 34 returned to its normally closed condition, a voltage differential from the control panel 18 can be again impressed upon the segment 24.

The isolator circuit 20*b* may or may not stay in its open circuit condition, depending upon whether or not a short is present in the segment 26. If not, the relay of the isolator 20*b* will return to its normally closed condition, applying a voltage differential across the segment 26 to the isolator circuitry 20*c*.

As a result of the above process, the segment, such as the segment 28, wherein the short or the defective condition is located, will continue to be isolated from the rest of the system 10. The respective isolator circuits on each side of the short or defective condition will be held in a normally open condition by the presence of the applied voltage differential across the lines L1, L2. The remainder of the system 10 will continue to function normally.

The circuit 30 is particularly advantageous in that the standby current is essentially zero in the absence of a short circuit condition. Because the circuit 30 consumes essentially no current in the stand-by condition, there are no cumulative line loading effects from the use of numerous isolation circuits 30 in a system such as the system 10.

The relay, such as the relay 34, can be a high quality, very inexpensive switching component. Because of its electromechanical nature, the relay 34 may be less expensive and will be more impervious to transient or line noise than a semi-conductor switch used for the same purpose.

Figure 3:
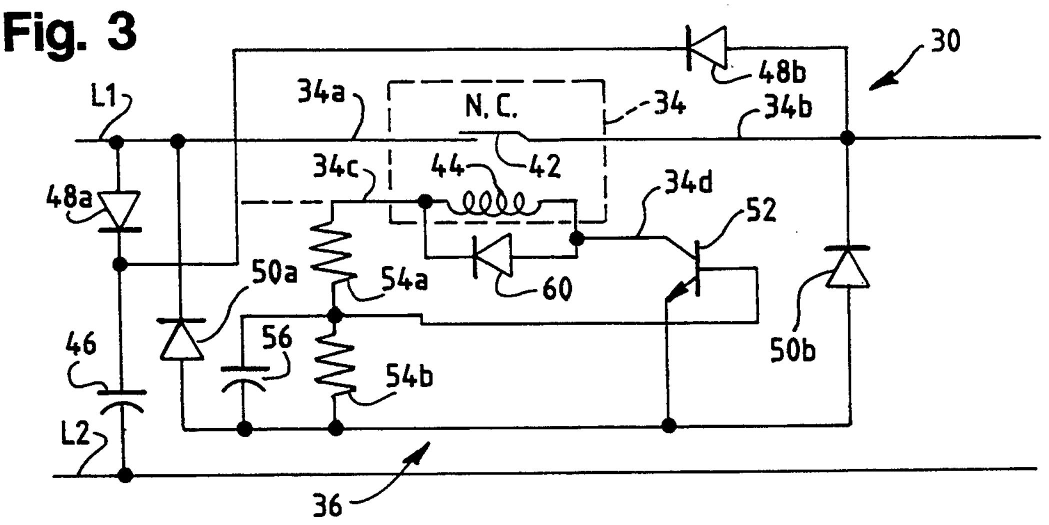
FIG. 3 is a schematic diagram of the isolator circuit of FIG. 2.

FIG. 3 illustrates the structure of the isolation circuit 30 in greater detail. The isolator 30 includes the relay 34, which has a normally closed contact 42 and a control coil 44.

The contact 42 of the relay 34 is capable of being electrically coupled in series with the line L1, and is closed during normal operation. In the event that the control coil 44 is energized, the contact 42 is opened, creating an open circuit in the line L1.

A capacitor 46 is used as the energy storage element 32. Capacitor 46 may be charged or recharged directly from the lines L1, L2 on both sides of the contact 42 through diodes 48*a*, 48*b*.

Switching circuitry 36 is used to detect the presence of low voltage or a short circuit between the lines L1, L2. Under normal operating conditions during which a voltage difference is maintained across the lines L1, L2, a pair of diodes 50*a*, 50*b* are biased in an off state, i.e., reverse-biased and nonconducting. Under these circumstances, a transistor 52 coupled thereto is also in an off state, biased into its cut-off region of operation.

In a preferred embodiment, a voltage divider formed of resistors 54*a*, 54*b* is used in combination with a capacitor 56 as transient suppression circuitry. The parallel combination of resistors 54*a*, 54*b* and the capacitor 56 creates a time constant controlling the rise time of the base-emitter voltage of the transistor 52. This creates a delay in turning on the transistor 52, and tends to prevent transistor 52 from turning on due to transient voltage drops on the lines L1, L2. A diode 60 is employed to limit inductive voltage spikes across the relay coil 44, which may result when the transistor 52 turns off.

Under normal operation, the circuit 30 has essentially zero current requirements in the stand-by state. With a normal voltage differential, for example 15–30 volts, across the lines L1, L2, the capacitor 46 will be charged to the nominal line voltage less any voltage drop across the diodes 48*a*, 48*b*. In this condition, little or no current will flow in the voltage divider resistors 54*a*, 54*b*. The filter or delay capacitor 56 will have zero volts thereacross. As a result, no current will flow in the coil 44 and the relay 34 will be in its normally closed, unenergized state.

In the event that a short or a low voltage condition appears across the lines L1, L2, diodes 48*a*, 48*b* will become reversed-biased by the voltage across the capacitor 46, which corresponds to a previously stored quantity of energy. The diodes 50*a* and 50*b* will also become forward-biased. In this condition, current will begin to flow from the capacitor 46 through the voltage divider formed of resistors 54*a* and 54*b*. At the same time, the delay capacitor 56 will begin to charge.

When the voltage across the resistor/capacitor combination 54*b* and 56 increases sufficiently, transistor 52 will begin to conduct. As the voltage at the collector of transistor 52 falls, current beings to flow in the coil 44. When sufficient current flows in the coil 44, the contact 42 will open, thereby providing an open circuit condition between ports or terminals 34*a* and 34*b*.

The quantum of energy previously stored on capacitor 46 will provide current for a predetermined period of time to energize the relay coil 44. If, during this time interval, a voltage differential reappears across the lines, such as the lines L1, L2, on one side of the circuit 30 but not the other, this voltage differential will forward-bias either the diode 48*a* or the diode 48*b*. In this condition, additional current will be supplied via the forward-biased diode through the resistor 54*a* to maintain the transistor in its conducting state, thereupon holding the relay 40 in its open circuit state for as long as need be. This provides an opportunity to locate the short circuit or low voltage condition, and to remedy same while simultaneously powering the activated isolation circuit or circuits with electrical energy from the lines L1 and L2.

Once the short circuit or low voltage condition has been remedied, and a nominal voltage differential reappears on the lines L1, L2 on both sides of the circuit 30, the diodes 50*a*, 50*b* again become non-conducting, and the capacitor 46 is recharged to its stand-by or steady state voltage and energy level. Further, the current in the coil 44 ceases to flow and the contact 42 assumes its normally closed state, thereby providing a continuous electrical path through the isolator 34 for the transmission lines L1, L2.

In the event of a subsequent short or low voltage condition, the above process will automatically repeat itself. The isolator circuits, such as circuits 20*a*–20*c*, will then automatically provide the necessary isolation function and then reset themselves when the short circuit or low voltage condition has been remedied.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. An isolation circuit for responding to and isolating a short circuit or a high loading condition in an electrical transmission system in which a voltage difference above a predetermined value is periodically or usually maintained across at least two conductors comprising:

a normally-closed, non-latching, relay having an energy input as well as first and second switch ports, said switch ports of said relay being couplable in series with one of the conductors;

the said relay maintaining a very low impedance when the line voltage temporarily goes to a low value until it switches to an open state;

an energy storage element coupled to said energy input of said relay, said energy storage element being capable of storing a predetermined quantity of energy in the presence of the voltage difference; and switching circuitry coupled to said switch ports, to said energy input of said relay and to said energy storage element, and being couplable to at least one of the conductors, said circuitry being capable of changing state in the presence of the short circuit or high loading condition where the line voltage will not go above a predetermined level, thereby discharging said stored energy of said energy storage element into said energy input and opening said relay, thereby isolating the short circuit or high loaded section.

2. A circuit as in claim 1 including further circuitry for closing said relay, and restoring said quantity of energy in said energy storage element, in response to a restoration of the voltage difference across the lines.

3. A circuit as in claim 1 wherein said switching circuitry includes:

a first diode coupled to said first switch port of said relay and a second diode coupled to said second switch port of said relay, wherein each of said diodes is reverse-biased in the presence of the voltage difference and forward-biased in the presence of the short circuit in the conductors; and a solid state switch, coupled to said energy input of said relay and to said diodes, wherein said switch is capable of switching on in the absence of a voltage difference in the conductors, thereby discharging said energy storage element through said energy input and opening said relay.

4. A circuit as in claim 1 wherein said energy storage element includes a capacitor.

5. A circuit for responding to and isolating a short circuit in an electrical transmission system in which a voltage difference is usually maintained, at least intermittently, across at least two lines, comprising:

a normally-closed, non-latching, relay having first and second terminals, and having a control coil with first and second ends, wherein said relay exhibits an open circuit between said terminals when said coil is energized, said terminals being couplable in series with one of the lines;

an energy storage element coupled to said first end of said coil, said energy storage element being capable of storing a predetermined quantity of energy; and switching circuitry coupled to said ends of said coil and to said terminals of said relay, wherein said circuitry is capable of responding to the presence of a short circuit, thereupon discharging said energy storage element, and energizing said coil to isolate the short circuit.

6. A circuit as in claim 5 including further circuitry for closing said relay and recharging said energy storage element in response to restoration of the voltage difference across the lines.

7. A circuit as in claim 6 wherein said energy storage element includes a capacitor.

8. A circuit as in claim 6 wherein said energy storage element includes an inductor.

9. A circuit as in claim 5 including further circuitry for charging said energy storage element in response to the presence of a voltage difference across the lines.

10. A circuit as in claim 9 wherein said charging circuitry includes:

first and second diodes each having first and second ends, wherein each of said diodes is coupled at said first end to said energy storage element, said second end of said first diode is coupled to said first terminal of said relay, and said second end of said second diode is coupled to said second terminal of said relay, and wherein each of said diodes is oriented to be forward-biased in the presence of the voltage difference across the lines.

11. A circuit as in claim 5 wherein said switching circuitry further includes:

at least one diode having first and second ends, wherein said diode is coupled to said first terminal of said relay, and is oriented so as to be reverse-biased in the presence of the voltage difference across the lines and forward-biased in the presence of a short circuit in the lines;

a transistor having first, second, and third terminals, wherein said first terminal of said transistor is coupled to said second end of said coil, and said second terminal of said transistor is coupled to said second end of each of said first diode, such that said transistor is non-conducting in the presence of the voltage difference across the lines and conducting in the presence of a short circuit in the lines; and a voltage divider having a first part and a second part, wherein said first part is coupled to said first terminal of said coil and to said third terminal of said transistor, said second part of said voltage divider is coupled to said third terminal of said transistor and to said second terminal of said transistor.

12. A circuit as in claim 11 wherein said transistor is a bipolar transistor.

13. A circuit as in claim 11 wherein said transistor is a field effect transistor.

14. A circuit as in claim 5 which includes transient suppression circuitry for delaying an energizing of said coil for a predetermined period of time in response to the presence of a short circuit.

15. A circuit as in claim 14 wherein said delaying circuitry includes means for forming a time constant.

16. A method of responding to and isolating a low voltage condition in an electrical transmission system in which an intermittent voltage difference is maintainable across at least two lines, comprising:

storing a quantity of energy;

detecting the low voltage condition;

determining if the detected condition has been present for a predetermined period of time and in response thereto, using the stored quantity of energy to create an open circuit in one of the lines for a period of time, thereby isolating the condition; and restoring the voltage difference across at least a portion of lines and using that voltage differences to maintain the open circuit.

17. A method as in claim 16 including providing a non-latching, normally closed, relay, and coupling same in series with one of the lines and energizing the relay with the stored energy to create the open circuit.

18. An isolation circuit for responding to and isolating a low voltage condition or a short circuit in an electrical transmission system in which a voltage difference can usually be maintained across at least two conductors comprising:

a normally-closed relay having an energy input as well as first and second switch ports, said switch ports of said relay being couplable in series with one of the conductors;

an energy storage element coupled to said energy input of said relay, said energy storage element being capable of storing a predetermined quantity of energy in the presence of the voltage difference; and switching circuitry coupled to said switch ports, to said energy input of said relay and to said energy storage element, and being couplable to at least one of the conductors, said circuitry being capable of changing state in the presence of one of a low voltage condition or short circuit, thereby discharging said stored energy of said energy storage element into said energy input and opening said relay, thereby isolating the short circuit.

* * * * *